United States Patent
Durrant et al.

(10) Patent No.: US 6,615,096 B1
(45) Date of Patent: Sep. 2, 2003

(54) METHOD USING STATISTICALLY ANALYZED PRODUCT TEST DATA TO CONTROL COMPONENT MANUFACTURING PROCESS

(75) Inventors: Douglas J. Durrant, Mission Viejo, CA (US); Gerald L. Hill, Huntington Beach, CA (US); Linda S. Perez, Laguna Niguel, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/494,175

(22) Filed: Jan. 31, 2000

(51) Int. Cl.[7] ............................................. G06F 19/00
(52) U.S. Cl. ....................... 700/115; 700/109; 700/110; 707/104.1
(58) Field of Search ........................... 700/95, 115, 116, 700/215, 221, 224–227, 105–111, 121; 702/81, 84, 179, 180, 182, 183, 185, 187; 705/7, 28, 29; 707/104.1

(56) References Cited

U.S. PATENT DOCUMENTS

| | | | | |
|---|---|---|---|---|
| 5,442,545 A | * | 8/1995 | Matsui et al. .................. | 705/29 |
| 5,491,637 A | * | 2/1996 | Kraemer et al. ............ | 700/115 |
| 5,889,674 A | * | 3/1999 | Burdick et al. .............. | 700/121 |
| 5,978,751 A | * | 11/1999 | Pence et al. ................. | 702/179 |
| 6,381,509 B1 | * | 4/2002 | Thiel et al. .................. | 700/115 |
| 6,381,556 B1 | * | 4/2002 | Kazemi et al. ............. | 702/182 |
| 6,446,017 B1 | * | 9/2002 | Skidmore .................... | 702/81 |

* cited by examiner

*Primary Examiner*—Leo Picard
*Assistant Examiner*—Steven R. Garland (57) ABSTRACT

A method and system for providing a manufacturing information system is disclosed. The system comprises a means for receiving and storing in a data warehouse component identifiers for identifying component manufacturing parameters for a quantity of components. The system further includes product identifiers for identifying manufactured products. The system further comprises a relational means for relating the component identifiers with the product identifiers for the products in which the components are included. The system further comprises a means for receiving a sub-set of the product identifiers, wherein the sub-set of product identifiers is for identifying a sub-set of the products which have a variation in performance. The system further comprises an analytical tool for correlating at least one of the component identifiers with the received sub-set of product identifiers, thereby identifying the component manufacturing parameter identified by the at least one component identifier as a possible cause of the variation in performance.

26 Claims, 6 Drawing Sheets

METHOD USING STATISTICALLY ANALYZED PRODUCT TEST DATA TO CONTROL COMPONENT MANUFACTURING PROCESS

BACKGROUND OF THE INVENTION

1. Field of the Invention

The invention relates to a method using statistically and visually analyzed product manufacturing test data contained within a data warehouse to control a component manufacturing process. More specifically, the invention comprises a method and system for using data-mining techniques to identify correlations between component manufacturing test attributes and variations in performance for products in which the components are included.

2. Description of the Prior Art and Related Information

Today's ever smaller manufactured products may comprise multitudes of components which are assembled in manufacturers' manufacturing facilities. In order to secure steady supplies and obtain lower pricing on components, manufacturers of the products may use a plurality of sources for the components. Such a diversification technique may include receiving different groups, or lots, of the same component from different manufacturers to be included in the same product line or model.

Typically, components are shipped from the component suppliers in lots that have similar component manufacturing parameters. Such parameters may comprise, for example, the specific supplier from which a particular lot originated, the shipping method used for transporting the lot to the product manufacturer, or the time of year (date code) that the lot of components were manufactured. Such parameters may cause a variation in the quality, reliability or performance of a particular lot of components, thereby causing a variation in the performance of the assembled product.

The lots are typically identified by a lot number, called a component identifier herein, which identifies the lot to the product manufacturer and the supplier, the component identifier usually being used for accounting purposes or traceability to manufacturing parameters of the lot. However, especially with small electronic components, the component identifiers themselves may not be imprinted or bar-coded on the components themselves due to practical considerations such as component size, or the extra time and expense in manufacturing that would be required to do so. Therefore, once the components leave their packing materials in which they were shipped, the lot from which those components came from may not be able to be identified.

Certain lots of components may be in some way defective or vary in their performance due to the different manufacturing conditions referenced above, or due to a certain component supplier's neglect or breach in promise to supply a certain quality of components. One solution that has been employed heretofore is for the manufacturer to test statistically significant numbers of components from each lot as they arrive from the individual suppliers. However, with products that are sold for low profit margins, such testing and delay in product assembly has become untenable. More and more product manufacturers have been forced to rely on component suppliers' representations that the supplied components meet the standards set by the product manufactures, or that the supplied components fall within set standard deviation of performance within each lot. Such reliance has proven inadequate in countless situations, with many product manufactures having their products show variations in performance when it is too late to trace the suspect components back to the lot from which they came.

Thus, there is a need for a system and method for identifying the lots for components causing variations in performance of products. There is further a need for a system that organizes information relating products and the components that are included in those products. There is further a need to provide a system that can take a given group of products showing the variation in performance and statistically identify the lots of the components that are suspected of causing the variation. There is a further need for a system and method for identifying component and product manufacturing parameters that may be the cause of a product's variation in performance.

SUMMARY OF THE INVENTION

The invention can be regarded as a method and system for providing a manufacturing quality information system for a manufacturer. The system comprises a means for receiving component identifiers from a component manufacturer, wherein the component identifiers are for identifying component manufacturing parameters which may comprise key manufacturing process indicators for a quantity of components received from the component supplier. A component identifier is an alphanumeric string that uniquely tracks a device or assembly through the manufacturing process. The system farther comprises a data warehouse for storing product identifiers, wherein the product identifiers are for identifying products manufactured by the manufacturer, and wherein the data warehouse is farther for storing the component identifiers. The system further comprises a relational means for relating the component identifiers with the product identifiers for the products in which the components are included. The system farther comprises a means for designating a sub-set of the product identifiers, wherein the sub-set of product identifiers is for identifying a sub-set of the products which have a variation in performance. The system farther comprises an analytical tool for identifying at least one of the component identifiers identifying component manufacturing parameters as having a correlation with the received sub-set of product identifiers, thereby identifying a component manufacturing parameter identified by the at least one identified component identifier as a possible cause of the variation in product performance.

The invention can also be regarded as a method and system for providing a component supplier quality information system for a component supplier. The system comprises a plurality of component identifiers corresponding to component manufacturing or test parameters for a plurality of components provided to a product manufacturer. The system further comprises a means for receiving product identifiers from the product manufacturer for identifying products in which the components are included. The system farther comprises a data warehouse for storing the product identifiers, and for storing the component identifiers. The system further comprises a relational means for relating the component identifiers with the product identifiers for products in which the components are included. The system further comprises a means for receiving a sub-set of the product identifiers, wherein the sub-set of product identifiers are for identifying a sub-set of the products which have a variation in performance. The system further comprises a data mining computer program for identifying at least one of the component identifiers as having a correlation with the received sub-set of product identifiers thereby identifying at least one of the component manufacturing parameters identified by the one identified component identifier as a possible cause of the variation in performance.

In another embodiment of the invention comprising another product manufacturing system, a method is described for using statistically analyzed manufacturing data for controlling product manufacturing. The method comprises the steps of creating a plurality of product identifiers, each product identifier for identifying at least one product manufacturing parameter for a sub-set of a plurality of products; designating a sub-set of the product identifiers which identify products which have a variation in performance; and correlating at least one of the product manufacturing parameters with the designated sub-set of product identifiers thereby identifying the at least one product manufacturing parameter as a possible cause of the variation in performance. Examples of product manufacturing parameters identified by the product identifiers may include number of drive platters, drive capacity or bios revisions for a product comprising a hard disk drive. The product identifier may further identify a manufacturer of a component and the site where the component was manufactured. Further identified attributes may include the manufacturing line, operator or assembly equipment identification code.

DETAILED DESCRIPTION OF A PREFERRED EMBODIMENTS

Figure 1:
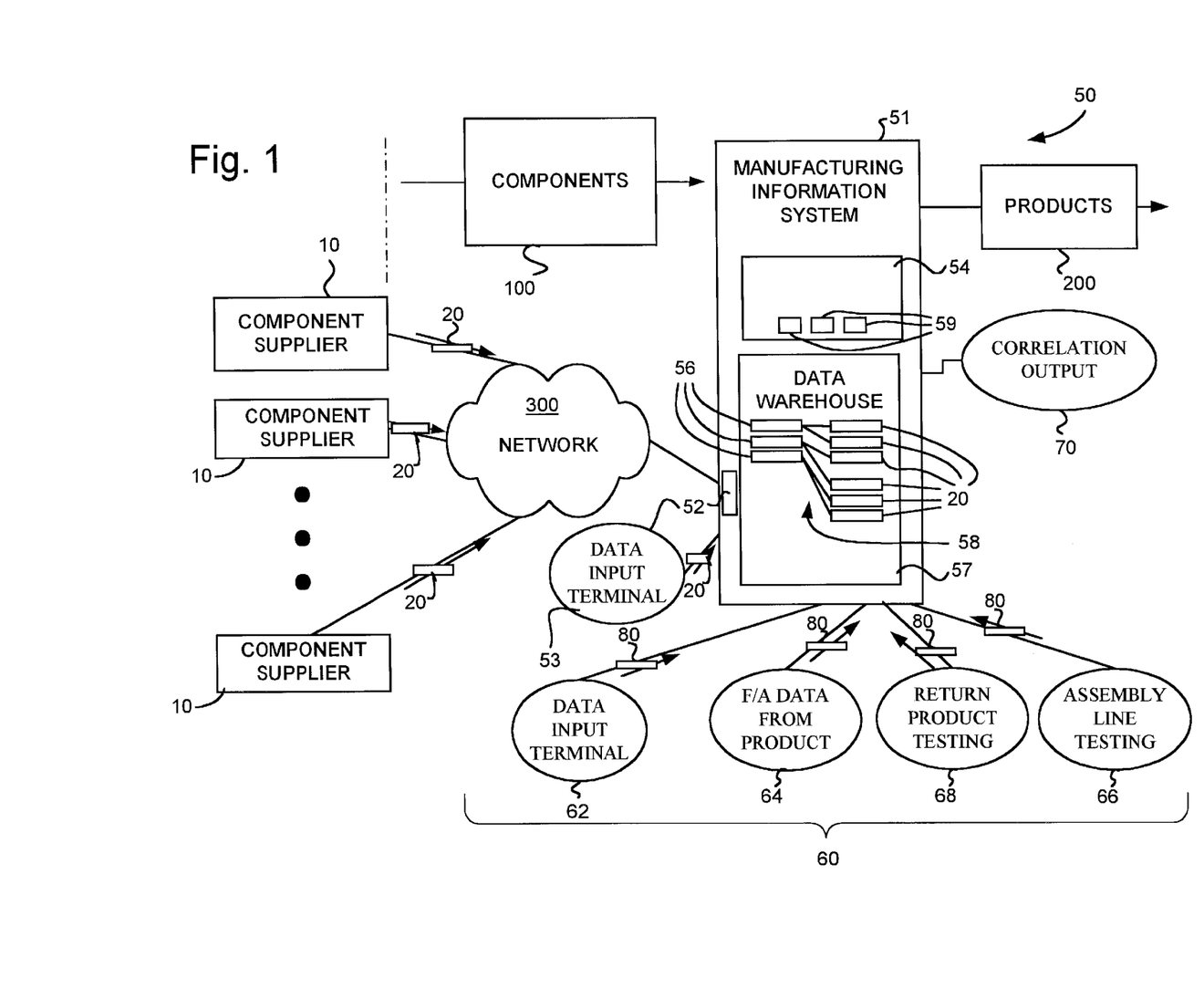
FIG. 1 is a block diagram showing an exemplary system structure for a manufacturing quality information system for a manufacturer using the present invention and a network electrically connecting the system to a plurality of component suppliers.

With reference to FIG. 1, an exemplary system structure for a manufacturing quality information system 51 for a manufacturer 50 using the present invention is shown. The system includes a means for receiving 52 component identifiers 20 from a component supplier 10. The component identifiers 20 are for identifying component manufacturing parameters for a quantity of components 100 received from the component supplier 10., The system includes a data warehouse 57 for storing product identifiers 56. The product identifiers 56 are for identifying products 200 manufactured by the manufacturer 50. The data warehouse 57 is further for storing the component identifiers 20.

A relational means 58 is provided in the data warehouse for relating the component identifiers 20 with the product identifiers 56 for products 200 in which the components 100 are included. The relational means may comprise an RDBMS system such as that produced by ORACLE Systems of Redwood Shores, Calif. or by NCR of Dayton, Ohio.

The system includes a means for receiving 60 a sub-set of the product identifiers 80, wherein the sub-set of product identifiers 80 is for identifying a sub-set of the products 200 which have a variation in performance. The means for receiving 52 the component identifiers 20 may comprise a network interface electrically connected to a network 300 wherein a plurality of component suppliers 10 are electrically connected to the network 300 over which the component identifiers 20 are transmitted. Alternatively, the means for receiving the component identifiers 52 may comprise a data input terminal 53 for entering the component identifiers 20 into the data warehouse 57 as the components 100 arrive, or in anticipation of the components 100 arriving, at the manufacturer 50. Alternatively, the means for receiving 52 the component identifiers 20 may comprise one or more dial-up communication lines subscribed to by the component suppliers 10.

The system comprises an analytical tool 54 for identifying at least one of the component identifiers 20 as having a correlation with the received sub-set of product identifiers 80 thereby identifying the component manufacturing parameter identified by the at least one component identifier 20 as a possible cause of the variation in performance. The analytical tool 54 may identify a plurality of component identifiers 20 as possible causes of the one or more variations in performance in products through a plurality of correlations. The correlations identified by the analytical tool 54 may comprise statistically significant correlations.

Exemplary analytical tools include statistical data tools, a data visualization tool, a data-mining tool, an on-line analytical processing (OLAP) tool, an information broadcast tool or some combination thereof The statistical data tool comprises a system for calculating statistics against the data in the data warehouse, which may include, for example, a means for executing multiple regressions. The data visualization tool comprises a multidimensional data-plotting tool allowing a human to view data in the data-warehouse in graphic form to recognize patterns of correlation in the data. A data-mining tool may comprise a series of data mining algorithms for recognizing correlations in the data in the data warehouse. The OLAP tool comprises a system for allowing queries to be performed against the data in the data warehouse, preferably by using query-by-example technology as those skilled in the art would recognize. An information broadcast tool allows users to be notified when a possible correlation is found by one of the above described analytical tools.

A correlation output means 70 is provided for presenting correlations. The output means 70 may comprise a computer terminal or screen in a workstation with a RISC or CISC processor. The OLAP tool allows the user to interactively query the data warehouse 57 through a graphical user interface on the computer terminal. The output means 70 may utilize the visualization tool to provide a form of data analysis involving pie chats, bar graphs or more complex displays in 3 or more dimensions through vectors or color plots. The output means 70 may be used to display the results of statistical methods including logistic regression, spline, interpolation or t-testing.

The embodiment having the analytical tool 54 comprising a data mining computer program may comprise a plurality of data mining sub-routines 59 for executing to identify the component identifiers 20 having the correlations with one or more sub-sets of product identifiers 80. Each sub-routine may comprise an algorithm defining a predictor for predicting a correlation between the component identifiers 20 and the sub-set of product identifiers 80. Each sub-routine 59 may be divided between a plurality of executable files for executing against the data warehouse 57.

The means for receiving 60 the sub-set of product identifiers 80 may comprise an input terminal 62 for entering product identifiers for products which have the variation in performance. Alternatively, the means for receiving 60 the sub-set of product identifiers 80 may comprise a means for capturing failure analysis data 64 from the products 200 which have the variation in performance. For example, some electronic products may keep an electronic record of the operations of the product, much like a "black box" commonly used in aircraft. This failure analysis data may be downloaded into the data warehouse 57. The failure analysis data may be utilized by the algorithms 59 during execution.

The means for receiving 60 the sub-set of product identifiers 80 may alternatively comprise a means for entering product identifiers for products which have the variation in performance from an assembly line testing system 66. Further, the means for receiving 60 the sub-set of product identifiers 80 may comprise a means receiving product identifiers 80 for products which are returned to the manufacturer 50 as shown at 68.

Each of the component identifiers 20 may further comprise, or point to, a lot data record. The lot data record 20 may comprise an identification code for identifying the component manufacturing parameters of the products 200, and a plurality of characteristic values representing information related to characteristics of the components identified by the component identifier 20. With this type of information stored in the data warehouse 57, the data-mining algorithms may be used to determine if the component supplier's 10 values provided for the characteristics are true, or to determine if components 100 with different values from those ordered should be used to prevent variations in performance. For example, if a particular component identifier 20 is for identifying a quantity of resisters received by a component supplier 10, some of values may comprise resistance and tolerance values for the resisters. The algorithms may be programmed to use the values stored in the lot data records 20 to determine if the claimed resistance or tolerance is true to performance, or if the tolerance for the next order of resisters should be upgraded.

Figure 2:
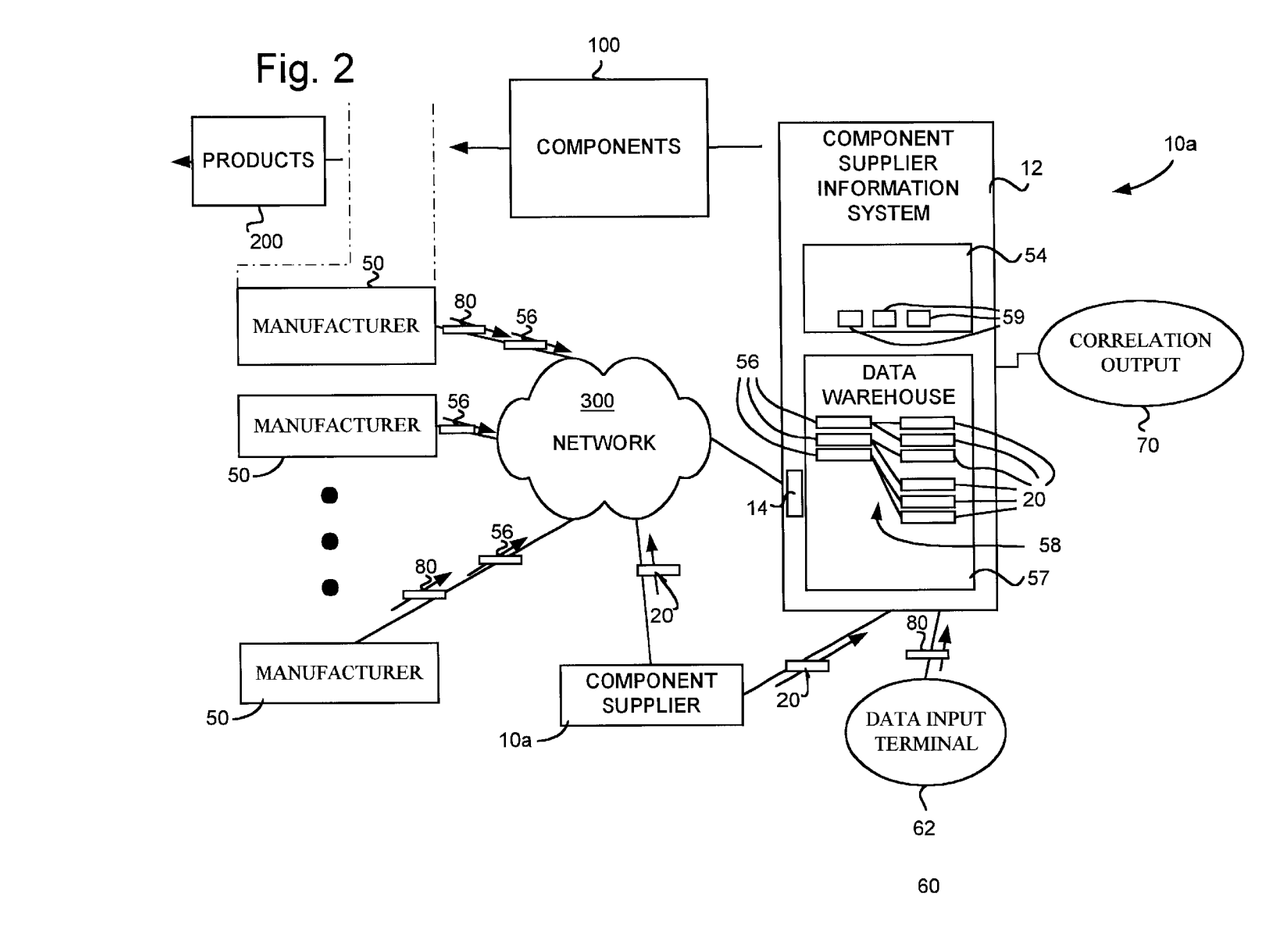
FIG. 2 is a block diagram showing an exemplary system structure according to a second embodiment of the present invention.

With reference to FIG. 2, a structural diagram is shown according to a second embodiment of the present invention. The embodiment illustrated in FIG. 2 comprises a component supplier quality information system 12 for a component supplier 10a. As with the embodiment shown in FIG. 1, the system comprises a plurality of component identifiers 20 corresponding to component manufacturing parameters for a quantity of components 100 provided to one or more product manufacturers 50. However, since the system of the embodiment shown in FIG. 2 is implemented within the component supplier 10, the system comprises a means for receiving 14 product identifiers 14 from the product manufacturer 50 for identifying products 200 in which the quantity of components 100 are included. The system comprises a data warehouse 57 for storing the product identifiers 56, and for storing the component identifiers 20.

The system may further receive component identifiers 20 from another component suppler 10 supplying components to the one or more manufacturers 50. In this case, the data warehouse 57 stores and processes component identifiers 20 for both component suppliers 10 and 10a.

The data warehouse 57 comprises a relational means 58 as described above with respect to FIG. 1 for relating the component identifiers 20 with the product identifiers 56 for products 200 in which the product components 100 are included.

The means for receiving 14 may also be used for receiving a sub-set of the product identifiers 80 wherein the sub-set of product identifiers 80 is for identifying a sub-set of the products 200 which have a variation in performance. The means for receiving 14 the sub-set of product identifiers 80 may comprise either a network 300 with a plurality of product manufacturers 50 electrically connected thereto, or a data input terminal 62 for entering the sub-set of product identifiers 80 into the data warehouse 57.

The system further comprises an analytical tool 54 as that described with respect to the embodiment of FIG. 1 for identifying at least one of the component identifiers 20 as having a correlation with the received sub-set of product identifiers 80. By identifying such a correlation, the component manufacturing parameter identified by the one identified component identifier 20 is identified as a possible cause of the variation in performance. The correlation identified by the analytical tool 54 may comprise a statistically significant correlation.

The system may further comprise a correlation output means 70 for presenting the correlation of the component identifier 20 with the received sub-set of product identifiers 80. The correlation output means 70 has the same functionality as that described with respect to the correlation output means 70 in the embodiment of FIG. 1.

As with the embodiment of FIG. 1, the analytical tool 54 of FIG. 2 may comprise a data mining computer program that comprises a plurality of data mining sub-routines 59 for executing to identify the at least one component identifier 20. Each sub-routine 59 may be executed within an executable file, wherein each sub-routine 59 comprises an algorithm defining a predictor for predicting the correlation between the at least one component identifier 20 and the sub-set of product identifiers 80.

The means for receiving 14 the product identifiers 56 is further for receiving the sub-set of product identifiers 80. Such means 14 for receiving the sub-set of product identifiers 80 may also comprise the data input terminal 62. As described above with respect to FIG. 1, the sub-set of product identifiers 80 are for identifying products 200 which have the variation in performance.

As described with respect to FIG. 1, each of the component identifiers 20 may farther comprise, or may be integrated with or point to, a lot data record 20, wherein the lot data record 20 comprises an identification code and a plurality of component manufacturing parameters for identifying the component characteristics.

Figure 3:
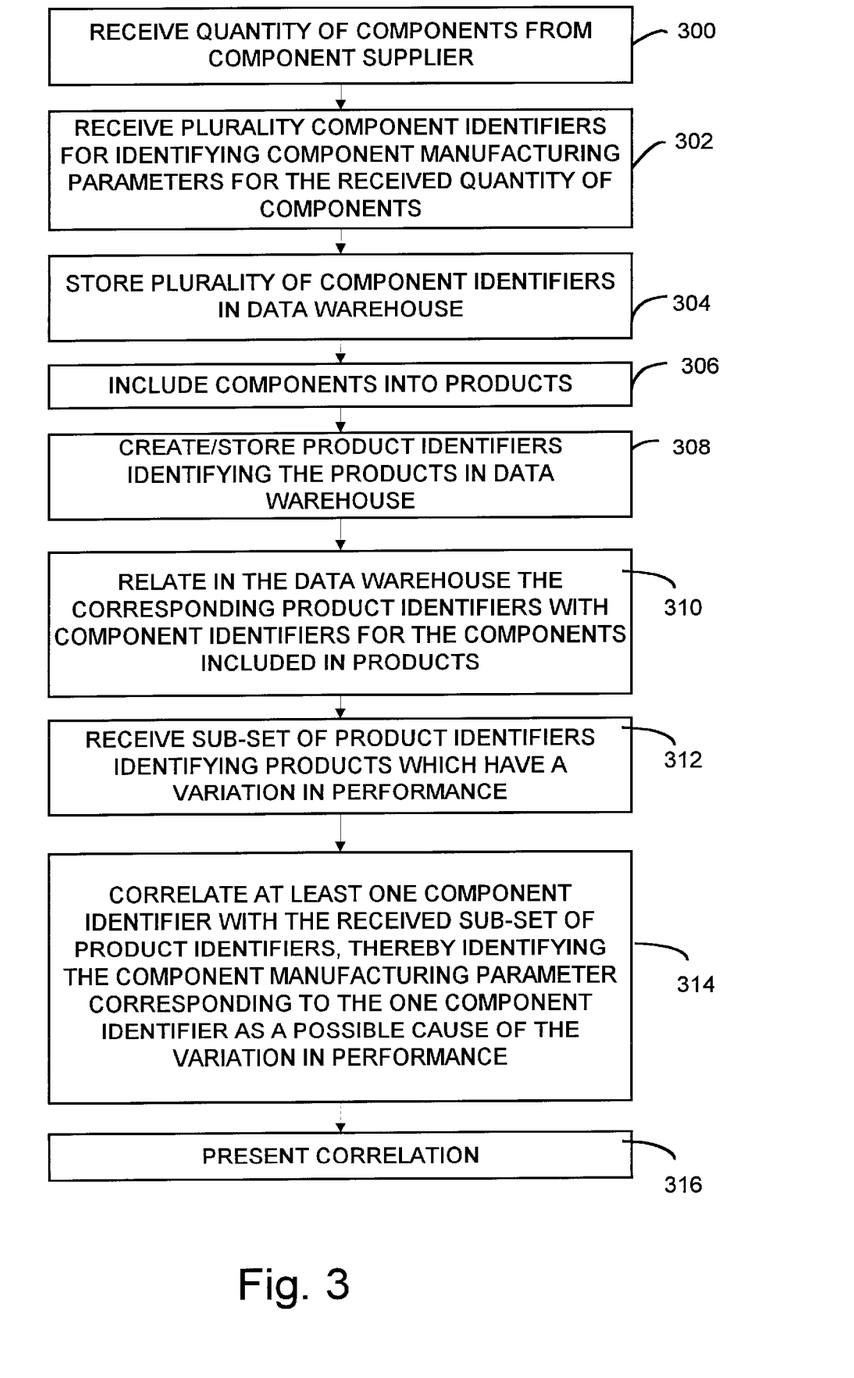
FIG. 3 is a flow diagram illustrating the steps performed by the embodiment of FIG. 1.

With reference to FIG. 3, a flow diagram illustrating the steps performed by the embodiment of FIG. 1 is shown. In the manufacturing quality information system 51 of the present invention, a method for using statistically analyzed manufacturing data for controlling the quality of components received from component suppliers is performed. The component identifiers 20 for identifying component manufacturing parameters for the quantity of components 100 received from each of one or more component suppliers are received, steps 300–302. The component identifiers 20 are stored in the data warehouse 57, step 304.

The product identifiers 56 may be created by the product manufacturer for identifying products 50 manufactured by the product manufacturer 50 and stored in the data warehouse 57, step 308. The product identifiers 56 may either be manually created according to certain standards for the manufacturer 50, or generated automatically by the system when products 200 are shipped. The product identifiers 56 may be affixed to the products by bar-code or in text format.

The components 100 are included in the manufacturing process into the products 200, step 310. The component identifiers 20 are then related with the product identifiers 56 for the products 200 which include the received quantity of components 100, step 310.

Either during manufacturing process testing, or upon return of some of the products 200, the sub-set of product identifiers 80 are received which identify products 200 which have a variation in performance, step 312.

The analytical tool 54 is used to identify at least one of the component identifiers 20 as having a correlation with the sub-set of product identifiers 80, thereby identifying at least one component manufacturing parameter corresponding to the at least one identified component identifier 20 as a possible cause of the variation in performance, step 314. For the embodiment employing a data-mining computer program, the data-mining computer program 54 may comprise a plurality of data-mining algorithms 59 adopted to identify one or more correlations, executed in a script as described with respect to FIG. 5 below.

Correlations are presented on the correlation output means 70, step 316.

Figure 4:
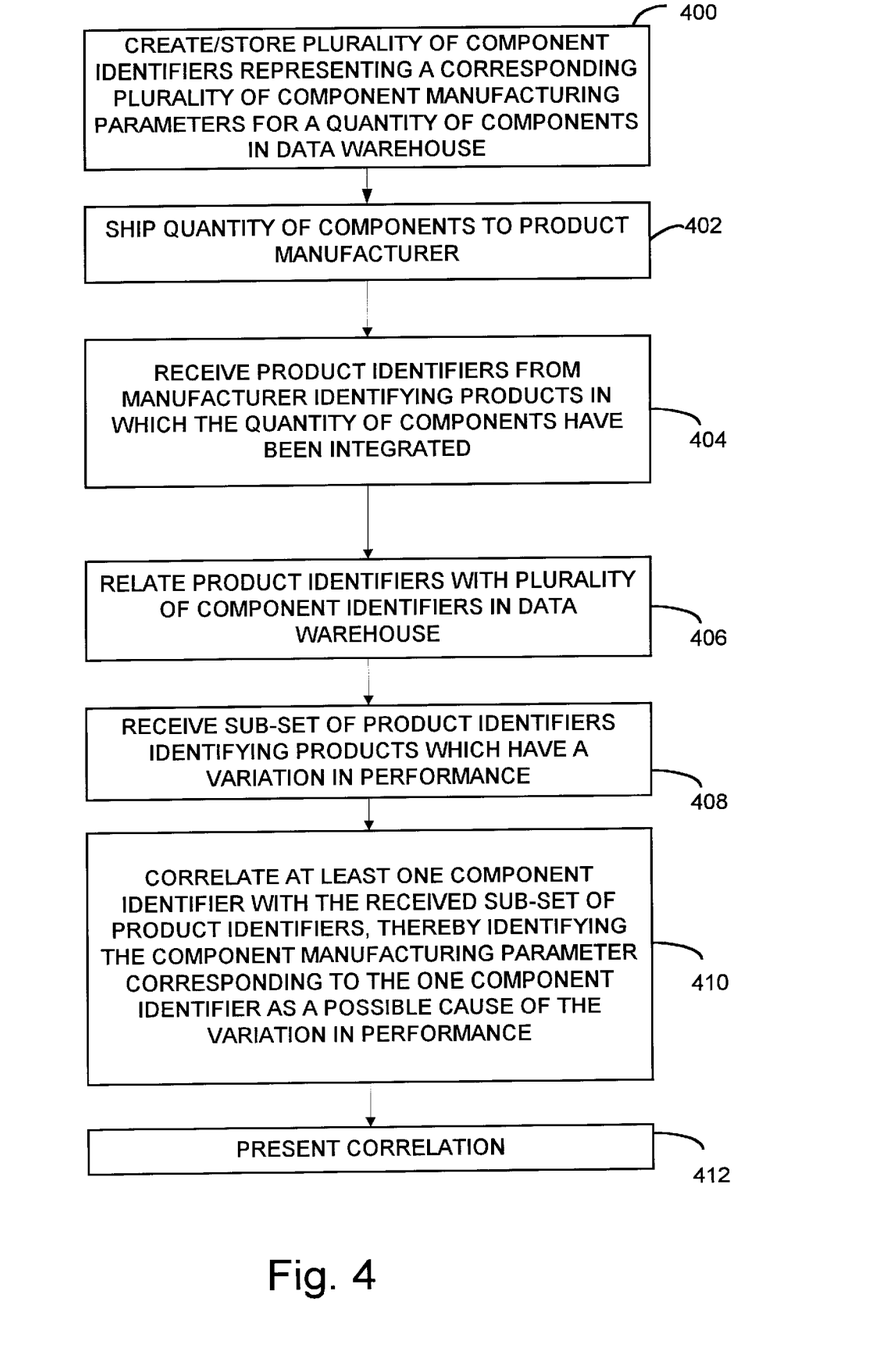
FIG. 4 is a flow diagram illustrating the steps performed by the embodiment of the system illustrated in FIG. 2.

With reference to FIG. 4, a flow diagram illustrating the steps performed by the embodiment of the system illustrated in FIG. 2 is shown. In a component supplier quality information system 12 the system performs a method for using statistically analyzed manufacturing data for controlling component 100 sales, shipping and/or fabrication by the supplier.

The system creates and stores component identifiers 20 corresponding to component manufacturing parameters for a quantity of components 100 to be provided to the product manufacturer 50, step 400. The component supplier 10a ships the quantity of components 100 to the product manufacturer 50, step 402.

From the product manufacturer 50, the component supplier 10a receives the product identifiers 56 for identifying products 200 in which the quantity of components 100 are included, step 404. The system then relates the component identifiers 20 with the product identifiers 56, step 406.

The system receives the sub-set of the product identifiers 80 which identify products 200 which have a variation in performance, step 408.

The data mining program 54 identifies at least one of the component identifiers 20 as having a correlation with the received sub-set of product identifiers 80, thereby identifying one or more component manufacturing parameters corresponding to the one identified component identifier 20 as a possible cause of the variation in performance, step 410. For an embodiment using a data-mining computer program, the data-mining computer program 54 may comprise a plurality of data-mining algorithms 59 adopted to identify the correlations, executing in a script as described with respect to FIG. 5 below.

The correlations are presented on the correlation output means 70, step 412.

Figure 5:
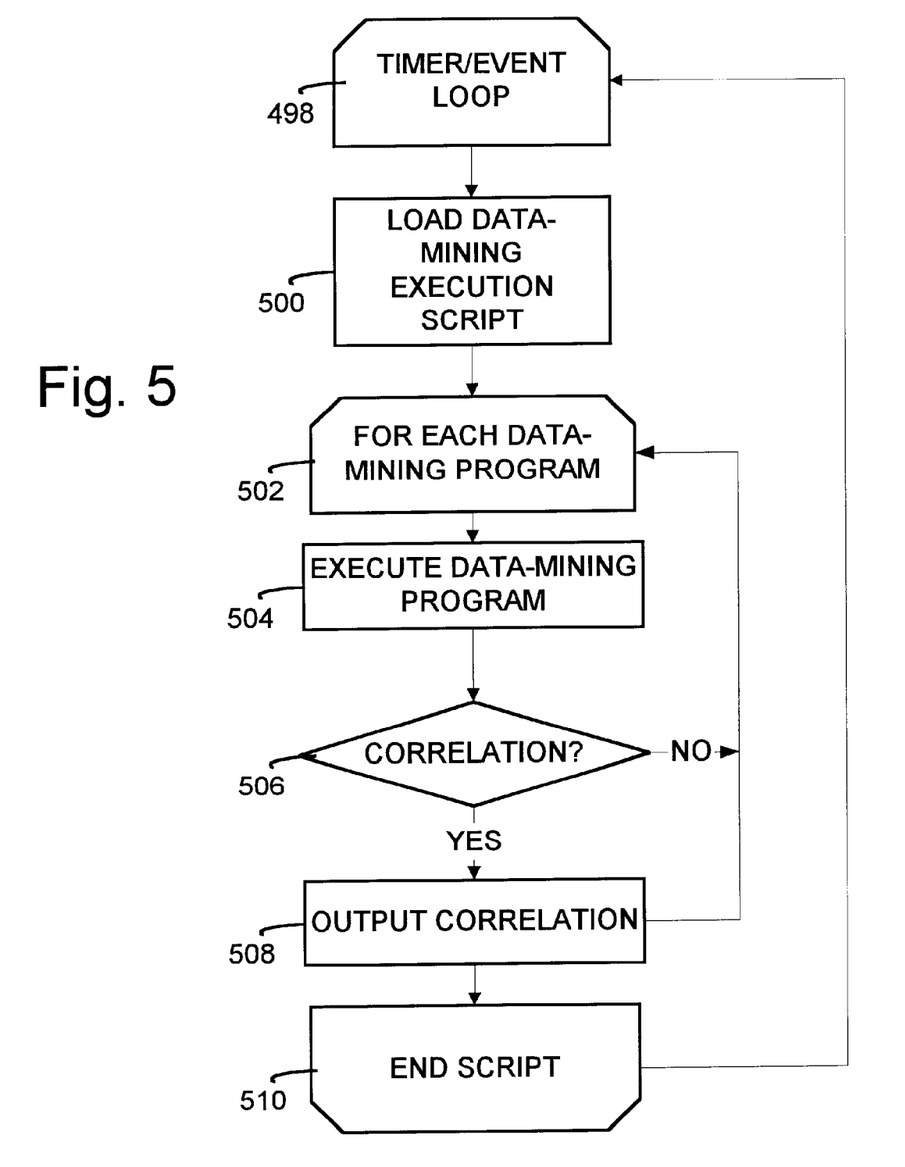
FIG. 5 is a flow diagram illustrating the steps performed by the computer program of FIGS. 1 and 2 embodied in a data-mining script.

With reference to FIG. 5, the steps performed by the data-mining computer program 54 embodied in a data-mining script is shown for an embodiment that uses a data mining computer program as an analytical tool 54. The script may be adopted to load a serious of executable files, each executable file comprising a data-mining algorithm 59. A script may be initiated by a system timer or a system event such as the receipt of the sub-set of product identifiers 80, step 498.

The system loads the data-mining script, step 500. The script may be implemented in a loop to load each successive data mining executable file, step 502. The script causes each loaded executable file to be executed, step 504.

If the algorithm for an executed file identifies a correlation, step 506, then the correlation is output on the output means 70, step 508.

After the executable files are executed within the script, processing moves back to step 498 to wait for the timer or next triggering event, step 510.

Figure 6:
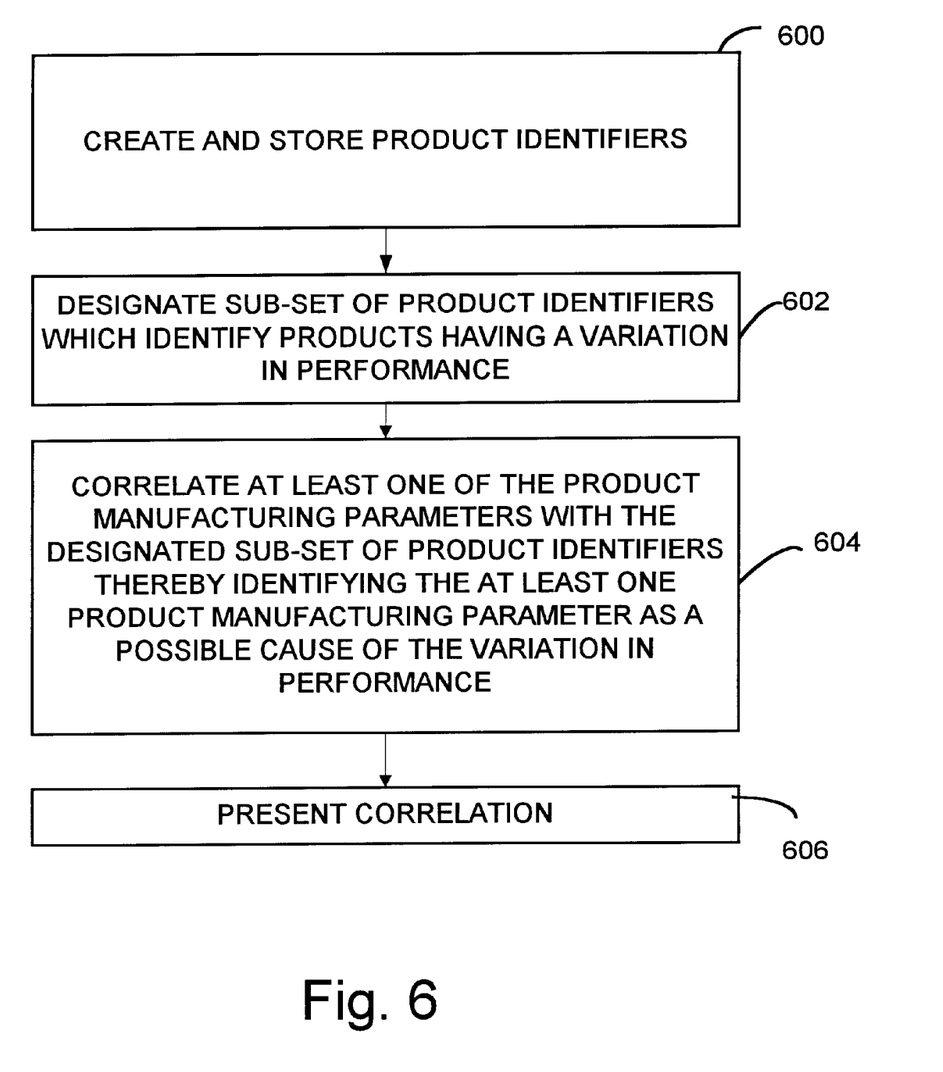
FIG. 6 is a flow diagram illustrating an alternative method implemented by the system of FIG. 1.

With reference to FIG. 6, in another embodiment of the system of FIG. 1, the product manufacturing system may be used to implement a method for using statistically analyzed manufacturing data for controlling the product manufacturing or assembly process itself. For assembly and fabrication of the products 200, a plurality of product identifiers 56 are created, each product identifier 56 for identifying a product manufacturing parameter for a sub-set of a plurality of products, step 600. Examples of product manufacturing parameters identified by the product identifiers 56 may include number of drive platters, drive capacity or bios revisions for a product comprising a hard disk drive. The product identifier 56 may further identify a supplier 10 of a component and the site where the component was manufactured. Further identified attributes may include the manufacturing line, operator or assembly equipment identification code.

The method includes a step of designating a sub-set of the product identifiers 80 which identify products which have a variation in performance, step 602. The analytical tool 54 described with respect to FIG. 1 is used for correlating at least one of the product manufacturing parameters with the designated sub-set of product identifiers 80 thereby identifying the at least one product manufacturing parameter as a possible cause of the variation in performance, step 604. The correlation may then be presented on the correlation output means 70.

What is claimed is:

1. A manufacturing information system for controlling the quality of components received from component suppliers and incorporated into products manufactured by a product manufacturer, said system comprising:

a means for receiving a plurality of component identifiers for identifying component lot data records for a plurality of components received from at least one component supplier, each component identifier for identifying a component lot data record for a sub-set of the plurality of components;

a plurality of product identifiers for identifying a plurality of products manufactured by said product manufacturer;

a data warehouse for storing the product identifiers and the component identifiers;

a relation means for relating the component identifiers of components incorporated into said products with the product identifiers for products in which the plurality of components are included;

a means for determining a sub-set of the product identifiers, the sub-set of product identifiers identifying a sub-set of the products which have a variation in performance; and an analytical tool for correlating at least one of the component identifiers with the designated sub-set of product identifiers thereby identifying the component lot data record identified by the at least one component identifier as a possible cause of the variation in performance.

2. The system of claim 1, wherein the analytical tool comprises a statistical tool.

3. The system of claim 1, wherein the analytical tool comprises a visualization tool.

4. The system of claim 1, wherein the analytical tool comprises an on-line analytical processing tool.

5. The system of claim 1, wherein the analytical tool comprises an information broadcast tool.

6. The system of claim 1, wherein the analytical tool comprises a data mining tool.

7. The system of claim 6, wherein the data mining tool comprises a plurality of data mining sub-routines for executing to identify the at least one component identifier.

8. The system of claim 7, wherein each sub-routine comprises an algorithm defining a predictor for predicting the correlating between the at least one component identifier and the sub-set of product identifiers.

9. The system of claim 1, further comprising a correlation output means for presenting output from the analytical tool.

10. The system of claim 1, wherein the means for receiving the component identifiers comprises a network interface electrically connected to a network, the component suppliers electrically connected to the network over which the component identifiers are transmitted.

11. The system of claim 1, wherein the means for receiving the component identifiers is a data input terminal for entering the component identifiers into the data warehouse.

12. The system of claim 1, wherein the means for designating the sub-set of product identifiers comprises an input terminal for entering product identifiers for products which have the variation in performance.

13. The system of claim 1, wherein the means for designating the sub-set of product identifiers comprises a means for capturing failure analysis data from the products which have the variation in performance.

14. The system of claim 1, wherein the means for designating the sub-set of product identifiers comprises a means for entering product identifiers for products which have the variation in performance from an assembly line testing system.

15. The system of claim 1, wherein the means for designating the sub-set of product identifiers comprises a means for designating product identifiers for products which are returned to the manufacturer.

16. The system of claim 1, wherein each component lot data record includes an identification code and a plurality of parameter values for identifying component manufacturing parameters.

17. The system of claim 16, wherein the component manufacturing parameters comprise traceable factory, line and process parameters.

18. A component supplier information system for controlling the quality of components provided to a product manufacturer and incorporated into products manufactured by said product manufacturer, said system comprising:
  a plurality of component identifiers corresponding to component lot data records for a plurality of components provided to said product manufacturer, each component identifier for identifying a component lot data record for a sub-set of the plurality of components;
  a means for receiving product identifiers for identifying products in which the plurality of components are included;
  a data warehouse for storing the product identifiers and the component identifiers;
  a relational means for relating the component identifiers of components incorporated into said products with the product identifiers for products in which the components are included;
  a means for determining a sub-set of the product identifiers, the sub-set of product identifiers identifying a sub-set of the products which have a variation in performance; and
  an analytical tool for correlating at least one of the component identifiers with the designated sub-set of product identifiers thereby identifying the component lot data record identified by the at least one component identifier as a possible cause of the variation in performance.

19. The system of claim 18, wherein the analytical tool comprises a data mining tool.

20. The system of claim 19, wherein the data mining tool comprises a plurality of data mining sub-routines for executing to identify the at least one component identifier.

21. The system of claim 20, wherein each sub-routine comprises an algorithm defining a predictor for predicting the correlating between the at least one component identifier and the sub-set of product identifiers.

22. The system of claim 20, wherein each sub-routine is for correlating the at least one component identifier by testing for a selected type of correlation between the sub-set of product identifiers and the at least one component identifier.

23. In a manufacturing information system, a method for using statistically analyzed manufacturing data for controlling the quality of components received from component suppliers and incorporated into products manufactured by a product manufacturer, said method comprising the steps of
  receiving component identifiers for identifying component lot data records for a plurality of components received from at least one component supplier, each component identifier for identifying a component lot data record for a sub-set of the plurality of components;
  creating product identifiers for identifying products manufactured by the product manufacturer;
  relating the component identifiers of components incorporated into said products with the product identifiers for the products which include the components;
  determining a sub-set of product identifiers which identify products which have a variation in performance; and
  correlating at least one of the component identifiers with the designated sub-set of product identifiers thereby identifying the component lot data record identified by the at least one component identifier as a possible cause of the variation in performance.

24. The method of claim 23, further comprising presenting the correlation.

25. The method of claim 24, wherein the step of correlating the at least one component identifier comprises executing a data-mining computer program comprising a plurality of data-mining algorithms.

26. In a manufacturing information system, a method for using statistically analyzed manufacturing data for controlling the quality of products manufactured by a product manufacturer and including components received from component suppliers, comprising the steps of
  creating component identifiers for identifying component lot data records for a quantity of components received from at least one component supplier, each component identifier for identifying a component lot data record for a sub-set of the plurality of components;

creating product identifiers for identifying products manufactured by the product manufacturer;

relating the component identifiers of components incorporated into said products with the product identifiers for the products which include the components;

determining a sub-set of product identifiers which identify products which have a variation in performance; and correlating at least one of the component identifiers with the designated sub-set of product identifiers thereby identifying the component lot data record identified by the at least one component identifier as a possible cause of the variation in performance.

* * * * *